Figure 1:
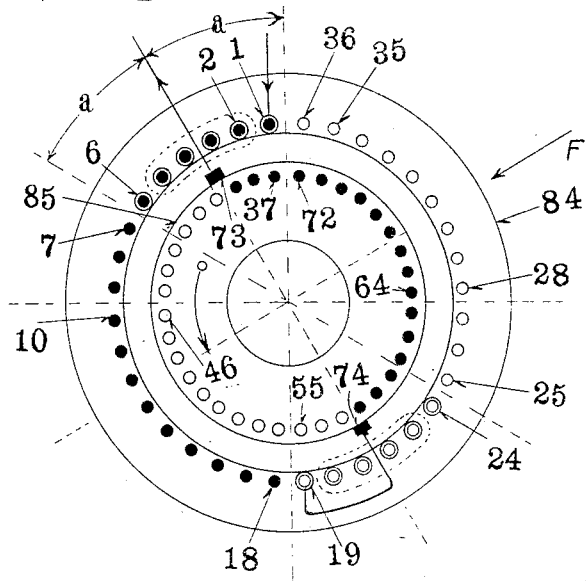

V. A. FYNN.
DYNAMO ELECTRIC MACHINE.
APPLICATION FILED MAY 28, 1917.
1,304,958.
Patented May 27, 1919.
3 SHEETS—SHEET 2.
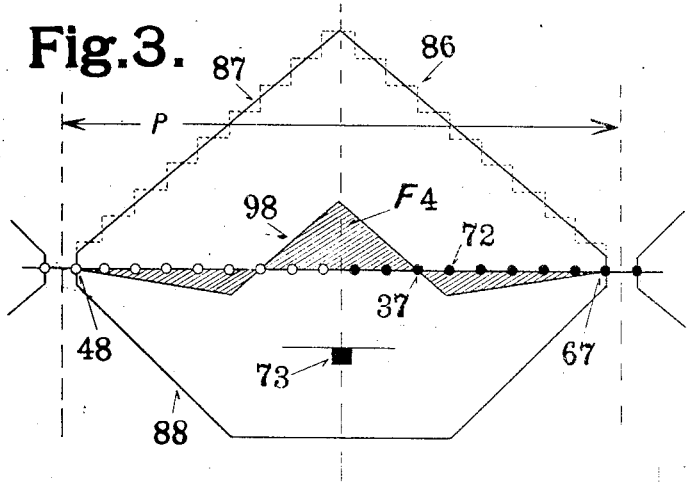
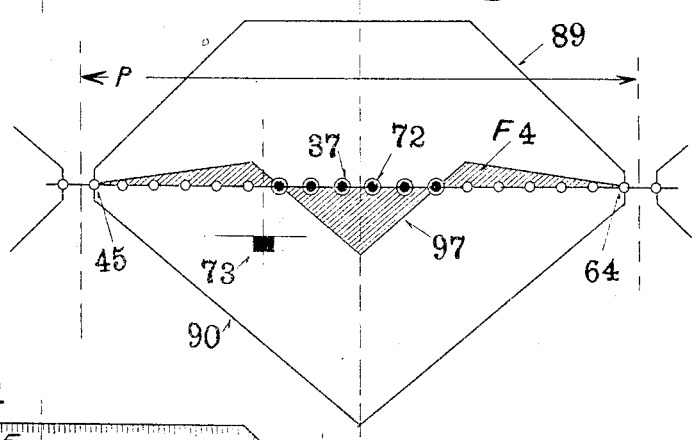
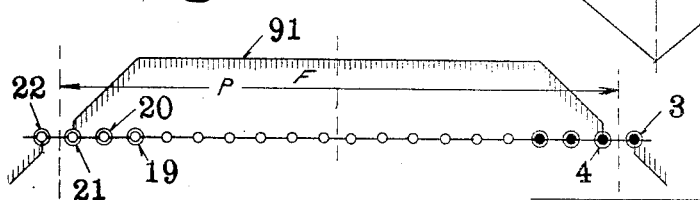
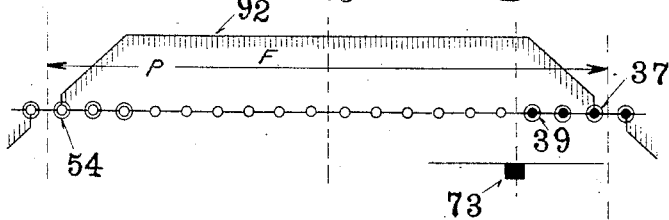
INVENTOR
Valère A. Fynn
BY
E. E. Huffman
ATTORNEY V. A. FYNN.
DYNAMO ELECTRIC MACHINE.
APPLICATION FILED MAY 28, 1917.
1,304,958.
Patented May 27, 1919.
3 SHEETS—SHEET 3.
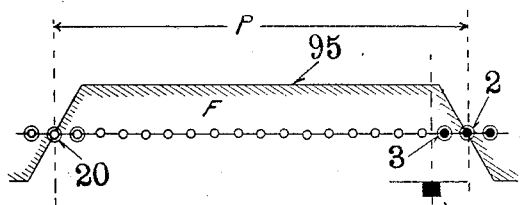
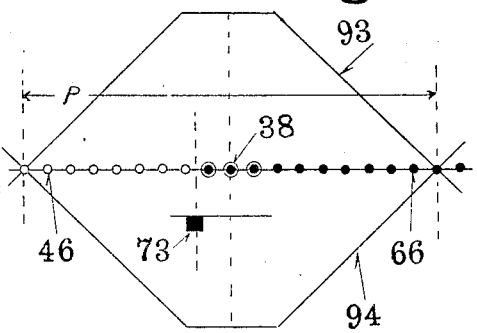
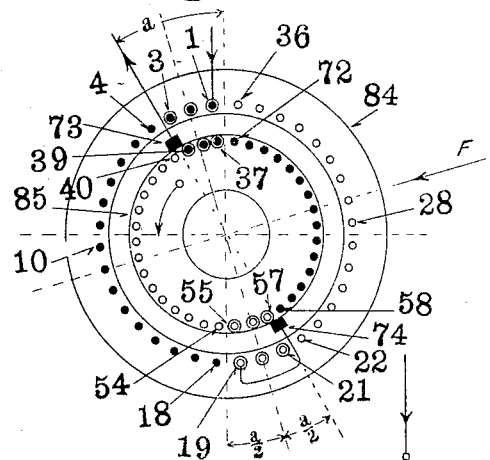
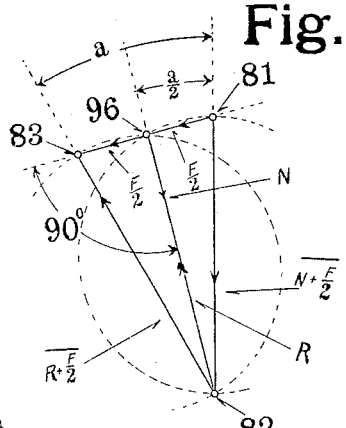
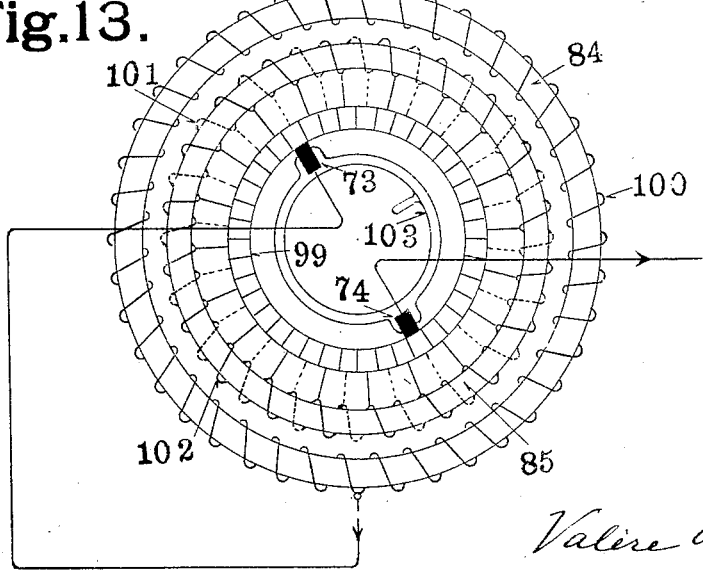
INVENTOR
Valère A. Fynn
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,304,958.        Specification of Letters Patent.      Patented May 27, 1919.

Application filed May 28, 1917. Serial No. 171,371.

*To all whom it may concern:*

Be it known that I, VALÈRE A. FYNN, a subject of the King of England, residing at the city of St. Louis, State of Missouri, United States of America, have invented a certain new and useful Dynamo-Electric Machine, of which the following is such a full, clear, and exact description as will enable any one skilled in the art to which it appertains to make and use the same, reference being had to the accompanying drawings, form part of this specification.

My invention relates to neutralized series conduction motors, and its main object is to produce a machine of this type, the speed torque characteristic of which may be adjusted within the widest possible limits by simply displacing the brushes coacting with the commutator without thereby affecting the degree of neutralization of the armature reaction and the full utilization of the motor windings in all brush positions.

I secure these desirable results by making use of the well-known form of motor in which there are no defined polar projections on either stator or rotor, and in which the windings on each member are distributed over the whole periphery of said member. I adapt this construction to my ends by so winding the stator and rotor as to produce the same number of effective ampere turns on each, whereby the resultant or motor field will be produced in part by some stator and in part by some rotor conductors, each member producing about one-half of the total motor field for all brush positions within the working range. By displacing the brushes in a machine constructed in the manner described I alter the ratio of armature to field turns and thereby change the speed torque characteristic of the machine without interfering with the full and perfect neutralization of the armature reaction and without diminishing or nullifying the useful action of any part of the windings by producing negative torques and the like. This improved machine also has less leakage than one of ordinary design and can therefore be used to better advantage even with a fixed brush position.

Since it is well-known that a series conduction motor will operate on alternating as well as on direct current provided its field structure be laminated and will even have the same characteristics on either current throughout that range of its operation for which its power factor, when run as an alternating current motor, is unity, or very near unity, it is clear that my invention is equally applicable to direct and alternating current motors. This invention can also be applied to alternating current or direct current generators, when it can be used for the purpose of changing the output of the machine at a given speed and feeding a given consumption circuit.

Figure 5:
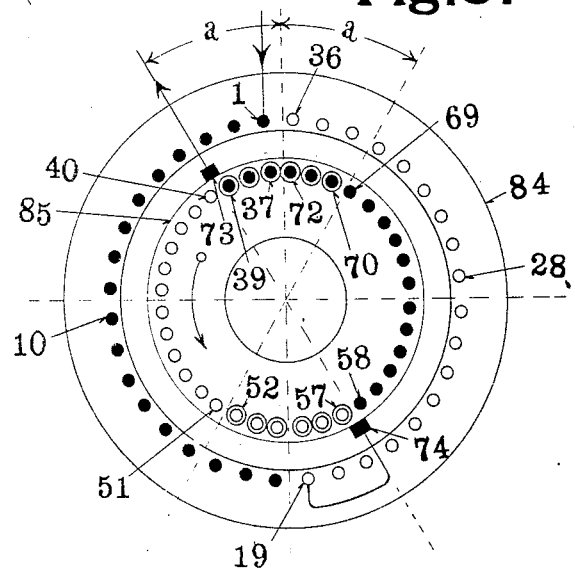

My invention will be better understood by reference to the accompanying drawings, in which Figures 1 and 5 diagrammatically represent two forms of known two-pole series conduction motors, while Figs. 2, 3, 4, 6, 7 and 8 are explanatory diagrams relating to these forms of motor. Fig. 9 is a diagrammatic representation of a two-pole motor, embodying my invention and Figs. 10, 11 and 12 are explanatory diagrams relating thereto. Fig. 13 is a diagrammatic representation of the preferred form of the improved machine.

It is known that the speed torque characteristic of a series conduction motor can be adjusted by changing the number of active turns in the field winding, which necessitates the use of contacts and precludes a gradual change; or by shunting the field winding or the armature and the neutralizing winding, a proceeding which not only precludes very gradual changes, but necessitates contacts, and is wasteful. Another known method of adjusting the speed torque characteristic of such a machine is to displace the brushes. If this be done in the case of a machine having distinct polar projections, then the neutralization of the armature reaction is interfered with, for as soon as the brushes are displaced from their normal position, part of the armature winding is utilized to strengthen or weaken the field magnetization, and the armature reaction, in line with the neutralizing winding and therefore at right angles to the motor field, is reduced. Under these circumstances the armature turns magnetizing along the axis of the neutralizing winding are reduced, while the turns in said winding remain unaltered, with the result that the machine becomes over-neutralized, a condition detrimental to commutation and, in the case of an alternating current machine, also detrimental to the power factor thereof.

Similar difficulties arise when it is attempted to displace the brushes of a neutralized series conduction motor without defined polar projections. What actually takes place can be better explained in connection with Figs. 1 to 8 inclusive.

Neutralized series conduction motors without defined polar projections have heretofore been proposed in which the stator axis was so displaced with respect to the rotor or brush axis that the rotor ampere turns were equaled and opposed by a part of the stator ampere turns, while the remaining stator ampere turns produced the motor field. To this end it was of course necessary to make the effective stator ampere turns greater than the effective rotor ampere turns. Such a machine is diagrammatically indicated in Fig. 1, which shows a two-pole motor comprising a stator 84 and a rotor 85. The stator is provided with 36 equidistant slots, located near its inner periphery, or polar face, and diagrammatically represented in the figure by means of small circles, some of which are totally filled in while others are not. The rotor is provided with 36 slots, located near its outer periphery, or polar face, and also diagrammatically represented by means of small circles, some of which are totally filled in. All of the stator and all of the rotor slots carry conductors the direction of the current in which is shown in the drawing, it being assumed that the conductors in the slots indicated by totally filled in circles carry current directed down through the plane of the paper, while those in the slots indicated by circles which are not filled in carry current directed up through the plane of the paper. The rotor is provided with an ordinary commuted winding connected in practice to a commutator not shown in the figure and with which coöperate the brushes 73, 74. In the figure these brushes are supposed to rest directly on the commuted winding. The stator may carry any kind of evenly distributed winding. A conductor entering slot 1 from the front, may, for instance, be returned to the front through slot 36, sent back through slot 2, returned through slot 35, and so on, finally coming back to the front through slot 19. The stator and rotor windings are connected in series by way of the brushes 73, 74, as shown in the figure; the current entering the stator at slot 1, leaving at the slot 19, entering the rotor at brush 74, and leaving it at brush 73. While the number of slots in the stator and rotor is the same in Figs. 1, 5 and 9, this is by no means a necessary condition. Furthermore, each of the slots may carry one or more conductors. In Fig. 1 the number of conductors per slot is so chosen that there are 116 evenly distributed stator ampere turns to every 100 evenly distributed rotor ampere turns. Ampere turns rather than turns are spoken of so as to avoid all indefiniteness. Such indefiniteness could, for instance, arise from the fact that a certain number of turns will produce, with the same line current, more ampere turns with one style of winding than with another.

Figure 2:
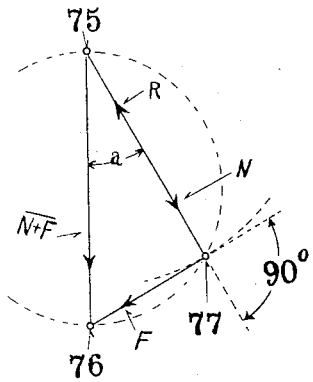

In order to make a neutralized series conduction motor of the machine of Fig. 1 it is necessary to so displace the rotor axis with respect to the stator axis as to fully neutralize the armature ampere turns, or speaking more accurately to annul as nearly as possible the flux produced by the armature ampere turns. To find the angle by which the brushes 73, 74 should be displaced in order to secure full neutralization of those rotor ampere turns which do duty as armature ampere turns, it is only necessary to describe a circle over the vector 75, 76 of Fig. 2, representing the stator ampere turns $\overline{N+F}$ in magnitude and direction, and to find the points of intersection between said circle and an arc described about the point 75 with a radius equal in magnitude to the ampere turns produced by the rotor. For a counter-clock displacement of the brush axis the point of intersection is at 77. The vector 77, 75 then shows the magnitude and direction of the rotor ampere turns R, and if the brushes 73 and 74 of Fig. 1 are displaced from their initial position in a counterclock direction through an angle "$a$" equal to that by which the vector 75, 77 is displaced from $\overline{N+F}$, then the ampere turns R, produced by the rotor, will be equal and opposed by the component N of the stator ampere turns, while another component F thereof, represented as to magnitude and direction by the vector 77, 76 in Fig. 2, will produce the motor field of the machine. In this case, where the stator ampere turns exceed the rotor ampere turns, the former are divided into two components, N and F. The first is coaxial with the rotor ampere turns and opposed to them in direction, while the second is at right angles to the rotor ampere turns. All the rotor conductors do duty as armature conductors. The conductors contributing to the stator component N are located in the stator slots 7 and 18 and 25 to 36 inclusive, and do duty as neutralizing conductors. The conductors responsible for the component F, do duty as exciting or motor field conductors, and are located in the stator slots 1 to 6 and 19 to 24 inclusive. Each of these slots is distinguished from the remainder by means of an additional circle. They are located within the angle $2^a$ bisected by the brush axis. The machine just described is a neutralized series conduction motor with stator excitation.

Figure 6:
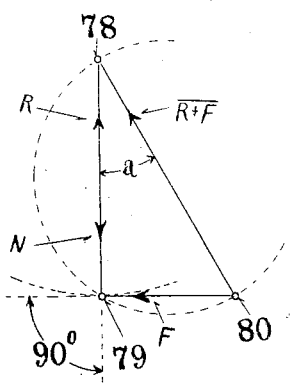

But it has also been proposed to so proportion motors of this type as to produce more ampere turns on the rotor than on the stator. It has been assumed in Fig. 5 that there are 116 evenly distributed rotor ampere turns for every 100 evenly distributed stator ampere turns. In order to ascertain how the brushes in Fig. 5 should be displaced from that position in which their axis coincides with the stator axis and the two members produce magnetizations of opposite direction, one may proceed as indicated in Fig. 6. In this figure the total rotor ampere turns $\overline{R+F}$ are represented as to magnitude and direction by the vector 80, 78. In order to find the correct relative position of stator and rotor axes, it is only necessary to describe a circle over this vector and find its points of intersection with an arc described about the point 78 with a radius equal in magnitude to the stator ampere turns N. For a counterclock displacement of the brush axis the point of intersection is at 79. The line 78, 79 then represents the magnitude and direction of the stator ampere turns. In this case it is the rotor ampere turns which are divided into two components at right angles to each other. The component R is equal in magnitude and opposed in direction to the stator component N. The stator slots carry nothing but neutralizing conductors. The component R is produced by conductors located in the rotor slots 40 to 51 and 58 to 69 inclusive. These conductors do duty as armature conductors. The other component F produces a magnetization at right angles to the stator magnetization and is due to the rotor conductors located in the slots 70 to 39 and 52 to 57 inclusive. Each of the slots accommodating these exciting conductors is distinguished from the remainder by means of an additional circle. These exciting conductors correspond to those located in the stator slots 1 to 6 and 19 to 24 inclusive of Fig. 1. In Fig. 5 the motor field producing conductors are located within the angle $2^a$ bisected, not by the brush axis as in Fig. 1, but by the stator axis. In this case the brushes are displaced from their initial position in the same direction and to the same extent as in Fig. 1. This machine is a neutralized series conduction motor with rotor excitation.

So far nothing but stator and rotor ampere turns have been considered, the brushes being so shifted as to oppose the ampere turns due to the rotor conductors doing duty as armature conductors, by an equal number of stator ampere turns. But the real object is to produce a machine in which the magnetization produced by the armature conductors is equaled and opposed by a stator magnetization. To this end it is not sufficient to secure an equality of ampere turns. It is also necessary that these ampere turns have identical space distribution.

Reverting to the motor of Fig. 1, the shape of the magnetic field produced by all the rotor ampere turns R, is correctly outlined by the dotted broken line 86 of Fig. 3. In order to simplify the drafting, this broken line is replaced by the averaging line 87, and this scheme is followed in Figs. 4, 7, 8, 11 and 12, for the same reason. The equal and opposite stator ampere turns N are due to the conductors located in the slots 7 to 18 and 25 to 36 inclusive, and the magnetization they produce has the shape outlined by the line 88. It is at once seen that the magnetic flux 88 cannot fully neutralize the magnetic flux 87. The difference is the magnetization $F_4$ shown by the shaded area of Fig. 3, outlined by the line 98.

In the case of Fig. 5, the rotor R produces a trapezoidal magnetization, whereas the opposing stator field N has the shape of a triangle. Here again the neutralization is not complete, the difference or resultant magnetization $F_4$ being indicated by the shaded area outlined by the line 97 of Fig. 7.

In Fig. 1 the motor field is due to the conductors located in the stator slots 1 to 6 and 19 to 20 inclusive, and has the shape outlined by line 91 of Fig. 4. In the case of Fig. 5, this motor field has exactly the same shape as in Fig. 1, as shown by the line 92 of Fig. 8, but is due to the rotor conductors located in the slots 70 to 39 and 52 to 57 inclusive.

From the foregoing it is seen that the neutralization of the armature reaction is not by any means perfect, or complete, even for the best possible brush position in Figs. 1 and 5. Any movement of the brushes out of this best position in either of these figures can only make matters worse. In the case of Fig. 1 the ratio of the armature to exciting or field ampere turns can be changed, and the speed torque characteristic of the machine altered, either by diminishing or by increasing the angle "$a$" by which the brushes are displaced from the stator axis. If this angle is diminished, then the field ampere turns are reduced, but the machine becomes over-neutralized. An increase of the brush displacement increases the exciting ampere turns, but decreases the neutralizing ampere turns, and the machine becomes under-neutralized. In the case of Fig. 5 a reduction of the brush angle "$a$" reduces the field ampere turns and increases the armature ampere turns, and the machine becomes under-neutralized. At the same time, the useful torque is diminished because of the production of a negative torque due to the coöperation of the rotor exciting ampere turns with that flux produced by the armature ampere turns of the rotor which is not neutralized by the stator ampere turns. If the brush displacement in Fig. 5 is increased, then the machine becomes over-neutralized because of a decrease of armature ampere turns at the expense of an increase of exciting ampere turns. The flux due to the difference between the neutralizing and the armature ampere turns coöperates with the rotor exciting ampere turns and adds to the torque of the machine.

For the proportions shown in Figs. 1 and 5, the better results are obtained for a brush displacement for which the armature ampere turns on the rotor are opposed by an equal number of stator ampere turns, or in other words, for the brush displacements shown. In Fig. 1 it is just as disadvantageous to decrease as to increase this angle. In Fig. 5 it is less disadvantageous to increase than to decrease it. In the case of a direct current motor these disadvantages mainly affect the commutation, except in the case of a decrease of the angle "a" of Fig. 5, when they also affect the efficiency. But when the machine is operated from an alternating current supply, then the disadvantages are more marked because of the fact that the leakage fluxes are smallest for the brush positions, shown in Figs. 1 and 5. How commutation is affected can be seen by reference to Figs. 3, 4, 7, and 8, where the brush 73 indicates the position of the coil undergoing commutation with relation to the flux in the armature as well as to that in the field axis.

Now in order to obviate these disadvantages I so wind a motor without distinct polar projections as to make its rotor ampere turns substantially equal to its stator ampere turns. It is assumed that Fig. 9 is wound according to this invention and that for every 116 equally distributed stator ampere turns there are the same number of equally distributed rotor ampere turns. Assuming the same initial brush position as in Figs. 1 and 5, in which the brush axis coincides with the stator axis and the stator produces a magnetization opposed to the rotor magnetization, the question as to how these brushes are to be displaced in order to produce a neutralized series conduction motor, can obviously not be answered with the help of either of the diagrams shown in Figs. 2 or 6, and which were successfully used in connection with the arrangements shown in Figs. 1 and 5. The rotor ampere turns being equal to the stator ampere turns, the only way that neutralization of a part of the rotor or stator ampere turns can be imagined is by decomposing each into two components at right angles to each other and so arranging matters that one rotor component shall equal and oppose one stator component. It is clear that if this condition is possible at all, it must exist for any brush angle. In Fig. 10 a brush angle "a" equal to the brush angle in Figs. 1 and 5, has been chosen, and the vectors 81, 82 and 82, 83, representing the stator and rotor ampere turns respectively, have been shown as displaced by that angle. If the stator ampere turns are to be decomposed into two components at right angles to each other, then the point of intersection of these components must lie on a circle, the center of which coincides with the middle point of the stator vector. The same obviously holds true for the vector representing the rotor ampere turns. Circles about the middle point of each of these vectors have accordingly been drawn in Fig. 10, and they intersect at the point 96. If the stator as well as the rotor ampere turns are so decomposed that their components intersect at this same point 96, then each of the stator components will equal one of the rotor components in magnitude. Decomposing the vector 81, 82 into the vector 81, 96 and 96, 82, and further decomposing the vector 82, 83 into a vector 82, 96 and into the vector 96, 83, it is seen that the rotor vector R, or 82, 96, representing the armature reaction, is equaled and opposed by the neutralizing stator vector N, or 96, 82, while the remaining stator and rotor vectors 81, 96 and 96, 83 are not only equal in direction, but in magnitude, and each contributes one-half of the motor field F. The rotor ampere turns are therefore made up of an armature reaction component R and of a field component F/2, while the stator ampere turns are made up of a neutralizing component N and a field component F/2.

Referring to Fig. 9, it is seen that the rotor component R is due to the conductors located in the slots 40 to 54 and 58 to 72 inclusive. These are the armature conductors. The magnetization they produce is equaled and opposed by the stator component N due to the neutralizing conductors located in the stator slots 4 to 18 and 22 to 36 inclusive. The resultant magnetization of the machine, or the motor field, is produced in part by the conductors located in the rotor slots 37 to 39 and 55 to 57 inclusive and in part by conductors located in the stator slots 1 to 3 and 19 to 21 inclusive. Each of the slots carrying these motor field or exciting conductors is distinguished from the rest by means of an additional circle. They are all located within the brush displacement angle "a" bounded on one side by the stator and on the other by the brush or rotor axis. This machine is a neutralized series conduction motor with rotor and stator excitation.

A glance at Fig. 9 is sufficient to show that the space distribution of the armature and the neutralizating conductors is exactly the same. The fluxes produced by these conductors must therefore have the same shape as is shown in Fig. 11, and it is seen that this improved motor is perfectly neutralized, the field $F_4$, which increases the impedance of the machine when operated from an alternating current circuit being absent. The shape and distribution of the motor flux is shown in Fig. 12. What is true of the brush displacement angle shown in Fig. 9, is true for any brush displacement, as is clearly seen from Fig. 10. A machine designed according to this invention will work as a perfectly neutralized series conduction motor on either alternating or direct current, for any brush position except for such as cause the stator and rotor axes to coincide. Starting from a position in which the axes of the two members coincide while their magnetizations oppose each other, the direction of rotation of the motor will be determined by the direction in which the brushes are displaced. It will have a different speed torque characteristic for each brush position, and in each brush position the armature ampere turns will be perfectly neutralized and all the conductors on the stator and rotor will be fully active. In addition to this the leakage conditions will be the same for all brush displacements, and the leakage fields will always be very much smaller in this improved motor than in the machine shown in Figs. 1 and 5, the leakage around the motor fields or exciting conductors in particular being very much reduced.

In order to obtain the best results with the style of commuted winding usually employed it is necessary to take into account the coils undergoing commutation when figuring the rotor ampere turns. In other words, it is necessary to make the effective rotor ampere turns equal to the effective stator ampere turns. As the brushes pass over the commutator they necessarily bridge at least two segments during the greater part of each revolution. If the brush width is equal to the segment width, then in some positions of any one brush relatively to the commutator no coils will be short circuited by said brush, while in all the others the brush will short circuit one or more coils according to the style of winding used. If the brush is wider than one commutator segment but does not exceed the width of two, then in some positions this brush will bridge two commutator segments, and in others it will bridge three segments short-circuiting a corresponding number of coils. The total rotor ampere turns should therefore be in excess of the total stator ampere turns by an amount depending on the width, number and position of the brushes, the number of turns per coil of the rotor winding and the style of the winding, so that the effective rotor ampere turns may be as nearly equal as possible to the effective stator ampere turns. In case the width of a brush equals the width of two segments, the minimum number of coils undergoing commutation is short-circuited by said brush during a period of time proportional to three times the width of the insulation between segments. The maximum number of coils undergoing commutation is short-circuited by said brush during a period of time proportional to the width of a segment less twice the width of the insulation between segments. Since the width of the insulation between segments is only a fraction of the width of a segment, the maximum number of coils will be short circuited for the longer period, and it is preferred, when dimensioning the rotor winding, to take into account the maximum number of coils undergoing commutation. In other words, a condition of substantial equality between the effective rotor and stator ampere turns will be reached when the windings on the two members are so proportioned that the current conducted through the stator winding produces the same number of ampere turns as the total rotor ampere turns less those statically or dynamically induced in the rotor. The statically or dynamically induced rotor ampere turns may be referred to as commutation ampere turns and should be kept as low as possible, for they increase the losses and magnetize along the armature as well as along the exciting or field axis.

In Fig. 13 is shown the preferred form of this improved motor. It comprises a stator 84 carrying a distributed winding 100, and a rotor 85 carrying the two commuted windings 101 and 102, the coils or elements of which are connected to alternate segments of the commutator 99. The brushes 73, 74, coöperating with the commutator 99, have a width equal to that of one commutator segment. Such dual windings have been proposed heretofore, but for the purpose of eliminating sparking by avoiding the short-circuiting of any element of either commuted winding. While the short circuiting of such elements is avoided, yet sparking is not suppressed, because the brushes connect one winding to the other at two or more points and thus create a closed circuit. In this case I make use of this dual winding for the purpose of keeping the effective rotor ampere turns more constant than is the case when an ordinary commuted winding is used. In the case of but one winding on the rotor the disturbance created by the coils undergoing commutation fluctuates and the current circulating in these coils often reaches very high values because of the low resistance of the circuit through which it closes. In the case of the two windings shown in Fig. 13, any current flowing from one winding to the other, when the two are interconnected by the brushes, will, for otherwise equal conditions, be very much smaller because of the very much greater resistance of the circuit, and practically all of the ampere turns this current produces in one rotor winding are neutralized by the ampere turns it produces in the other rotor winding. The resultant is usually so small as to be negligible, and no allowance need be made for coils undergoing commutation when two rotor windings are used, unless the width of a brush exceeds the width of a segment. It is true that in the arrangement shown in Fig. 13, the ohmic resistance of the armature or rotor is constantly changing, but, since the armature is connected in series with the stator, any effect that this change may have on the current taken by the motor will be felt in the stator as well as in the rotor, and the neutralization of the armature reaction will not suffer for that reason. The brushes 73, 74 are insulatingly supported by a brush rocker 103, provided with a suitable handle which allows the speed torque characteristic of the machine to be changed within the widest possible limits by simply moving the brushes.

In Fig. 13 no attempt has been made to show the correct number of turns on rotor and stator, and while Gramme ring windings are very convenient for the purpose of illustration, yet they would not be used in practice. Assuming the stator to be wound as is usual in such cases, and as has been, for instance, described in connection with Fig. 1, and the rotor to be provided with two independent windings, then for every 100 stator turns of the two-pole motor shown in Fig. 13, the rotor would have to be provided with 400 turns, irrespective of the style of winding used. In the case of a six-pole machine provided with two independent windings such as 101 and 102 of the multiple single type, the rotor would have to carry 12 turns to every one turn of the stator. If in this six-pole motor each of the independent windings were to be changed to a two-circuit single winding, then the rotor would have to carry four turns for every one stator turn.

Because of the perfect neutralization for every brush position of this improved motor, and of the consequent absence of all resultant fluxes in the armature axis and also because of the smaller leakage flux around the exciting stator and rotor ampere turns, this machine will have a smaller impedance than a corresponding one designed in accordance with Figs. 1 or 5, and other things being equal will therefore have a higher power factor when operated on alternating current. Such machines are consequently advantageous whether it is desired to adjust the speed torque characteristic or not. In other words, they may with advantage be used with the brushes in a fixed position. It is known that single-phase series conduction motors, in order to operate with a power factor equal to or near unity, must be designed with few exciting and many armature ampere turns, this ratio varying within wide limits. For low periodicities, in the neighborhood of 25 cycles, a ratio of 1:2 is usually highly satisfactory. For higher periodicities, such as 100, a ratio of 1:7 will give better results. Furthermore, it is easier to reach power factor values near unity at speeds above the synchronous. A motor which will operate within a certain speed range from an alternating current circuit of a given periodicity and voltage, with a power factor near unity, will show substantially the same characteristics within that range when operated from a direct current circuit of equal voltage.

Having fully described my invention, what I claim as new and desire to secure by Letters Patent of the United States is:

1. In a dynamo electric machine, the combination of a stator without defined polar projections and provided with a winding the active conductors of which are evenly distributed over the entire polar face of the stator, and a rotor provided with a winding having its active conductors distributed in a manner analogous to the distribution of the stator conductors, said rotor winding being connected in series relation with the stator winding to produce a magnetization axially displaced from the stator magnetization and said winding being so proportioned that the current conducted through the rotor winding produces substantially the same number of ampere turns as the current conducted through the stator winding.

2. In a dynamo electric machine, the combination of a stator without defined polar projections and provided with a winding the active conductors of which are evenly distributed over the entire polar face of the stator, and a rotor provided with a winding having its active conductors distributed in a manner analogous to the distribution of the stator conductors, said rotor winding being connected in series with the stator winding to produce a magnetization axially displaced from the stator magnetization and said winding being proportioned to produce the same number of effective ampere turns as the stator winding.

3. In a dynamo electric machine, the combination of a stator and a rotor having their windings connected in series to produce displaced magnetizations and proportioned and positioned to produce a substantially equal number of effective ampere turns having analogous space distribution.

4. In a dynamo electric machine, a stator provided with a winding distributed over its entire polar face, a rotor provided with a commuted winding and brushes, said winding being connected in series with the stator winding through said brushes to produce a magnetization displaced from that of the stator winding, said rotor and stator windings being positioned and proportioned to produce a substantially equal number of effective ampere turns having analogous space distribution, and means for shifting the brushes.

5. In a dynamo electric machine, the combination of a stator and a rotor, a commuted winding and brushes on the rotor, a winding on the stator connected in series with the commuted winding to produce a magnetization displaced from that produced by the commuted winding and so proportioned that the ampere turns produced by the stator winding are equal to the ampere turns produced by the portions of the rotor winding not short-circuited by the brushes.

6. In a dynamo electric machine, the combination of a stator and a rotor, a commuted winding and brushes on the rotor, a winding on the stator connected in series with the commuted winding to produce a magnetization displaced from that produced by the commuted winding and so proportioned that the ampere turns produced by the stator winding are equal to the ampere turns produced by the portions of the rotor winding not short-circuited by the brushes, and means for shifting the brushes.

7. In a dynamo electric machine, the combination of a stator provided with a distributed winding, a rotor provided with two windings and a commutator and brushes coöperating therewith, the conductors of each rotor winding being connected to alternate segments of the commutator, and means connecting the stator winding to the brushes, the proportions of the rotor and stator windings being such that the current conducted through the rotor by way of the brushes produces substantially the same number of ampere turns as the current conducted through the stator winding, and the brushes being so positioned that the axis of the rotor magnetization is displaced from the axis of the stator magnetization.

8. In a dynamo electric machine, the combination of a stator provided with a distributed winding, a rotor provided with two windings and a commutator and brushes coöperating therewith, the width of any brush not exceeding the width of any commutator segment and the coils of each rotor winding being connected to alternate segments of the commutator, and means connecting the stator winding in series relation with the rotor windings through the brushes, the proportions of the rotor and stator windings being such that the number of ampere turns produced by the stator is equal to the number of ampere turns produced by the rotor, and the brushes being so positioned that the axis of the rotor magnetization is displaced from the axis of the stator magnetization.

9. In a dynamo electric machine, the combination of a rotor provided with a commuted winding and brushes coöperating therewith, a stator having its winding connected in series with the rotor winding through said brushes, the stator and rotor windings being so proportioned and distributed that they produce equal and opposed magnetizations along an axis displaced from the brush axis for any position of the brushes in which the brush axis does not coincide with the stator axis.

10. In a dynamo electric machine, the combination of a rotor provided with a commuted winding and brushes coöperating therewith, a stator having its windings connected in series with the rotor winding through said brushes, the stator and rotor windings being so proportioned and distributed that they produce equal and opposed magnetizations along one axis and magnetizations of the same direction along another axis for any position of the brushes in which the brush axis does not coincide with the stator axis.

In testimony whereof I have hereunto set my hand and affixed my seal.

VALÈRE A. FYNN. [L. S.]